United States Patent
Torre

(10) Patent No.: US 6,351,928 B2
(45) Date of Patent: Mar. 5, 2002

(54) DEVICE FOR PACKAGING PRODUCTS IN CONTAINERS SEALED WITH STRETCHABLE PLASTIC FILM

(75) Inventor: Francesco Torre, Dalmine (IT)

(73) Assignee: Minipack Torre S.p.A. (IT)

(*) Notice: Subject to any disclaimer, the term of this patent is extended or adjusted under 35 U.S.C. 154(b) by 0 days.

(21) Appl. No.: 09/864,412

(22) Filed: May 25, 2001

Related U.S. Application Data

(63) Continuation-in-part of application No. 09/319,637, filed as application No. PCT/EP97/07144 on Dec. 11, 1997, now abandoned.

(30) Foreign Application Priority Data

Dec. 17, 1996 (IT) .......................................... MI96A2637

(51) Int. Cl.[7] .................................................. B65B 7/16
(52) U.S. Cl. ............................ 53/556; 53/297; 53/300; 53/329.3
(58) Field of Search .......................... 53/441, 478, 556, 53/300, 296–298, 389.2, 329.3–329.5, 485, 281, 282, 306, 307, 312, 313; 426/396

(56) References Cited

U.S. PATENT DOCUMENTS

| | | | |
|---|---|---|---|
| 2,928,222 A | * 3/1960 | Lindstaedt | 53/297 |
| 3,378,991 A | * 4/1968 | Anderson | 53/329.3 |
| 3,720,038 A | * 3/1973 | Bryan, Jr. et al. | 53/329.3 X |
| 4,035,985 A | * 7/1977 | Aoyama et al. | 53/453 |
| 4,050,971 A | * 9/1977 | Verkins | 53/296 X |
| 4,345,412 A | * 8/1982 | Balzer et al. | 53/297 |
| 5,155,974 A | * 10/1992 | Garwood | 53/329.3 X |
| 5,272,854 A | * 12/1993 | Ye et al. | 53/329.2 |
| 5,285,725 A | * 2/1994 | Imamaki et al. | 101/127.1 |
| 5,534,282 A | * 7/1996 | Garwood | 426/396 |

FOREIGN PATENT DOCUMENTS

FR 1405789 A * 5/1965

* cited by examiner

Primary Examiner—Stephen F. Gerrity
(74) Attorney, Agent, or Firm—Shlesinger, Fitzsimmons & Shlesinger

(57) ABSTRACT

A packaging device is provided with a feed unit for a highly stretchable polyethylene-based plastic film which during use is able to generate and maintain a high number of electric charges on its surface. A vertically movable head having on its lower end a gripping surface with a very smooth, mirror-like gripping surface, is then lowered to have its gripping surface engaged with the leading end of the film which overlies and is supported on a planar supporting surface. The smooth gripping surface of the head adheres cohesively by electrostatic molecular attraction to the film, which is then moved by the head over the upper end of a package containing food, or the like, which is to be covered by the film. The head then descends severing the film from the supply thereof and securing the edge of the film to the edge of the container.

18 Claims, 3 Drawing Sheets

Tav. III

DEVICE FOR PACKAGING PRODUCTS IN CONTAINERS SEALED WITH STRETCHABLE PLASTIC FILM

CROSS REFERENCE

This application is a continuation-in-part of application Ser. No. 09/319,637 filed Jun. 8, 1999 and now abandoned. Said application Ser. No. 09/317,637 is the national stage filing under 35 U.S.C. 371 of international application serial number PCT/EP97/07144 filed Dec. 11, 1997 and having an international publication number of WO 98/26983, published Jun. 25, 1998.

BACKGROUND OF THE INVENTION

This invention refers to a device for packaging products housed on a support with plastic film. Supports suitable for this type of packaging are the polystyrene trays sealed with transparent film, commonly used for packaging fruit, vegetables or other products. However, other types of supports are also utilizable, such as for example flat supports made of cardboard or other materials.

In the case of products which do not protrude from the container compartment, the container can be efficiently sealed quite easily with a relatively rigid and non-stretchable film, or sheet, secured to the edge of the compartment by various techniques, for example by sealing or rolling along the edge itself. Rigid film is easily handled for sealing over the tray.

On the contrary, whenever the products, due to their shape and size, protrude from the tray or in the case of products on a flat support, it is not possible to use a rigid sheet to seal the container. In this case it is necessary to use a very fine and consequently more difficult to handle stretchable film, which is tightly wrapped around the tray so as to cover the product to be packaged and peripherally have flaps folded underneath the tray, closely adhering. The folding of the flaps can be carried out either manually or mechanically.

It is obvious that, to ensure that the package is efficiently sealed, it is necessary to keep the peripheral flaps of the film quite long, resulting in an evident waste of material. Moreover, the integrity of the package cannot be guaranteed over time with absolute certainty; in fact, the adhesion of the film to the tray may diminish or the package may be inopportunely opened and then resealed. FR-A-1406789 discloses a packaging machine provided with a sealing head vertically movable over the product to be packaged so as to seal the film along the upper edge of the container. However, this kind of device involves a serious risk of breaking the film during the sealing operation. Further sealing machines are disclosed by US Pat. No. 3,378,991. The general scope of this invention is to obviate the above-mentioned problems by providing a device for packaging products in containers sealed with tightly stretched extensible plastic film, which makes it possible for the containers to remain sealed over time and to save a considerable quantity of film.

This scope is achieved according to the invention by providing a device for packaging products with an extensible plastic film on a base supporting the product, as claimed hereinafter. The innovative principles of this invention and its advantages with respect to the known technique will be more clearly evident from the following description of a possible exemplificative embodiment applying such principles, with reference to the accompanying drawings, in which:

Figure 1:
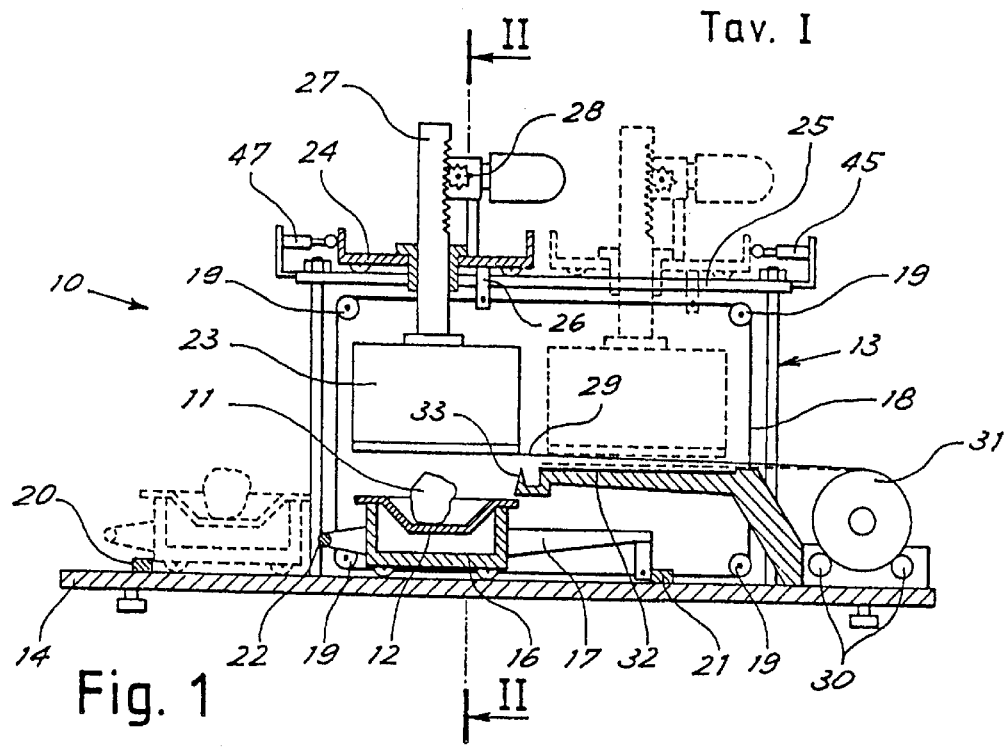
FIG. 1 shows a partially cutaway front view of a packaging device according to the invention.

With reference to FIG. 1, a device 10 for packaging products 11 contained in a compartment of a container 12, for example a normal polystyrene tray comprises a frame 13 secured to a bedplate 14. Sliding along the bedplate on runners 15 (visible in FIG. 2) is a saddle 16 to support the container 12.

The saddle 16 is fastened, by means of an arm 17, to a drive cable or belt 18 running in a closed loop around a plurality of pulleys 19 disposed on a substantially vertical plane inside the frame 13.

Disposed along the path of the saddle 16, defined by the runners 15, are detents 20, 21 for positioning the saddle in respective operating positions, which will be described further on. The saddle can be movable between these two positions by manual operation, by means of an appropriate handle 22; in this case, the belt 18 and the pulleys 19 are idle, and made to move by the saddle itself.

Alternatively, the saddle can be driven by the belt, by providing a suitable motor drive (not shown) in correspondence with one of the pulleys.

Figure 2:
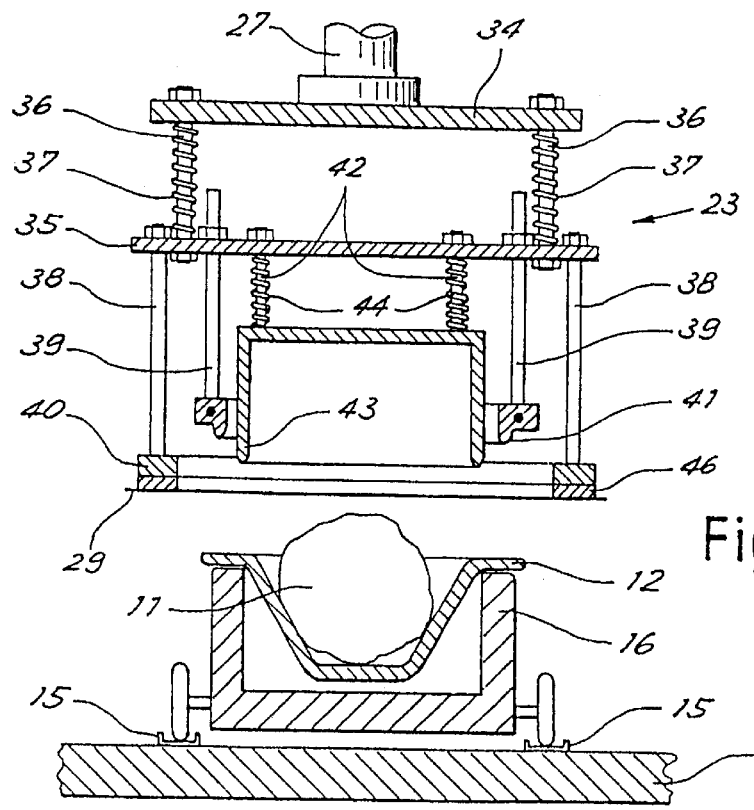
FIG. 2 shows an enlarged detail, viewed along the line II—II of FIG. 1, of the device according to the invention during a first phase of the packaging operation.
Figure 3:
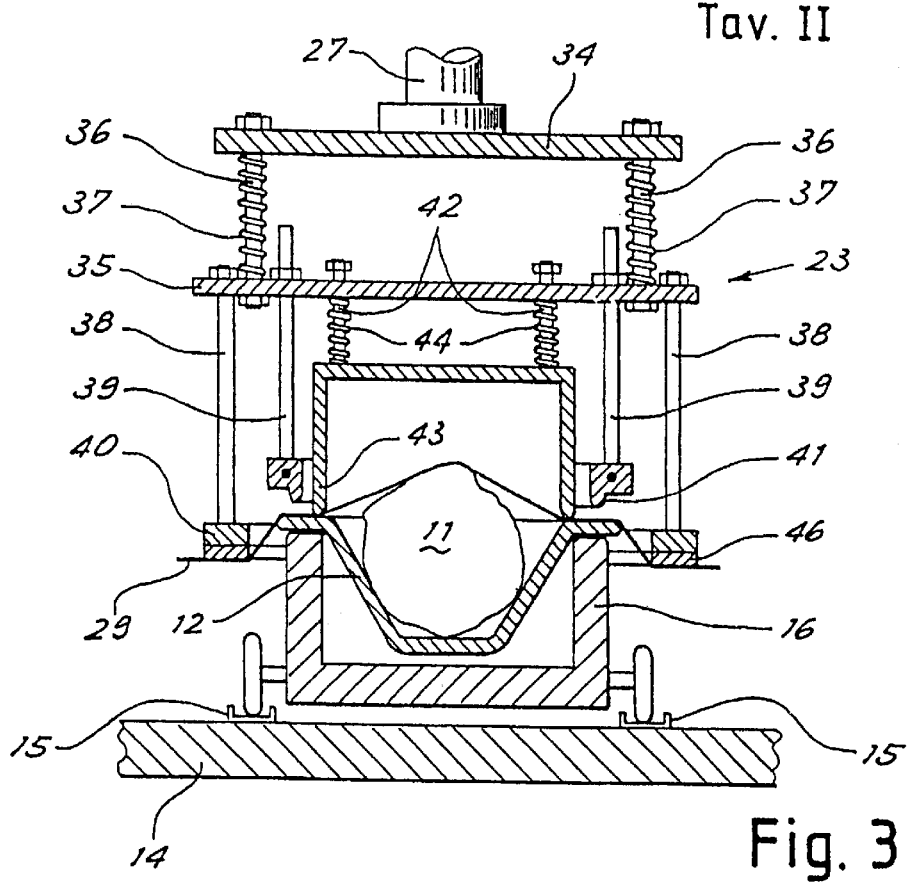
FIG. 3 shows a view similar to that of FIG. 2, during the subsequent phase of the packaging operation.

The device 10 also comprises a sealing head 23 (shown only schematically in FIG. 1), which will be described in detail further on with reference to FIGS. 2, 3 and 4. The sealing head is borne on a carriage 24 sliding in a horizontal plane along runners 25 disposed in the upper part of the frame 13. Like the saddle 16, the carriage 24 is fastened to the belt 18 by means of an arm 26.

Advantageously, the carriage 24 is connected to a leg of the belt 18 movable in the opposite direction to the leg of the belt to which the container-bearing saddle 16 is fastened. In this way, the carriage 24 and saddle 16 can be operated sychronously with a reciprocal approach/drawing apart motion.

The sealing head 23 is movable vertically with respect to the carriage 24 by means of known kinematic drive mechanism, for example a coupling between a rack 27 and a motor-driven pinion 28.

The packaging device 10 also comprises a feed unit for a highly stretchable polyethylene-based plastic film 29 of the kind of often employed for packaging foods and similar products, and which is able to generate and maintain a high number of electric charges on its surface. Device 10 is composed of a rotatable support 30 for a reel 31 of the extensible film and a surface 32 for resting the leading end of the film being unwound from the reel. Advantageously disposed at the end of the surface 32 is a blade 33 for cutting the portion of film 29 necessary for packaging a container, As can be clearly seen in FIGS. 2, 3, 4, the sealing head 23 comprises an upper plate 34 integral with the rack 27, which is connected to an intermediate plate 35 along runners 36, secured to said intermediate plate. Disposed along the runners 36 are counter springs 37, so as to maintain the two plates in the rest position as far apart from each other as possible. The intermediate plate 35, by means of respective spacers 38, 39, rigidly supports a frame or loop 40 for gripping and stretching the film 29 and a sealing frame or loop 41, containing an appropriate heating element, and also slidingly supports, along runners 42, a stretching pressing loop or frame 43. Disposed along the runners 42 are further counter springs to maintain the pressing loop at rest as far away from the plate 35 as possible.

It should be noted that, in order to achieve a correct sealing of the film on the container, the loops 41 and 43, and preferably also the gripping loop 40, are made in such a way as to follow the edge of the compartment containing the product to be packaged As will be clear further on, the pressing frame is shaped so as to press the taut film against the container in a more internal position with respect to the sealing frame. The film gripping and stretching frame, on the contrary, is disposed outside the sealing frame. A brief description will now be given of the operating cycle of the packaging device according to the invention. The saddle 16 is shifted to the stroke end against the detent 20 (position represented by the broken line in FIG. 1), where it is loaded with a container 12 with the product 11 to be packaged.

Simultaneously, thanks to the interconnection between the saddle 16 and the carriage 24 by means of the belt 18, the carriage 24 is pushed into position overlying the surface 32 supporting the film 29, (position also represented by the broken line in FIG. 1). Here the carriage operates a microswitch 45 which controls the lowering of the sealing head 23 by the rack-pinion coupling.

The head 23 descends towards the surface 32 until the film 29 can be gripped by the gripping loop 40.

Advantageously, the film can be gripped by cohesion or electrostatic molecular attraction, by providing the lower end of gripping loop 40 with a very smooth mirrorlike gripping surface 46 to which the film 29 will readily adhere cohesively. The head then returns to the raised position.

At this point, the saddle 16 can be guided towards the other stroke end 21, arranging itself in a suitable position to seal the container 12 with the film 29. Simultaneously the carriage 24, pulling the film with it, is shifted by the belt 18 exactly above the container 12 (position shown by the continuous line in FIG. 1). Here the carriage 24 operates a second microswitch 47 which controls the descent of the sealing head 23 towards the container 12. The head 23 is now in the position illustrated in FIG. 2. During the first part of the downward stroke of the head 23, the film 29 is cut by the blade 33 in the length required to seal the container 12.

The descent of the frame 40 below the edge of the tray causes the film to be suitably stretched. Further descent of the head 23 brings the pressing loop 43 into contact with the edges of the container 12, thereby blocking the taut film over the part of the product protruding from the package. This situation is clearly visible in FIG. 3.

At this point, the pressing loop 43 is blocked in its descent by the container 12. Thanks to the mobility of the intermediate surface 35 with respect to the pressing loop 43 along the runners 42, in contrast with the springs 44, said surface 35 continues its downward stroke, together with the sealing loop 41 and the gripping loop 40. The film is thus arranged adhering to the edge of the container, despite it being stretched and curved over the product.

Figure 4:
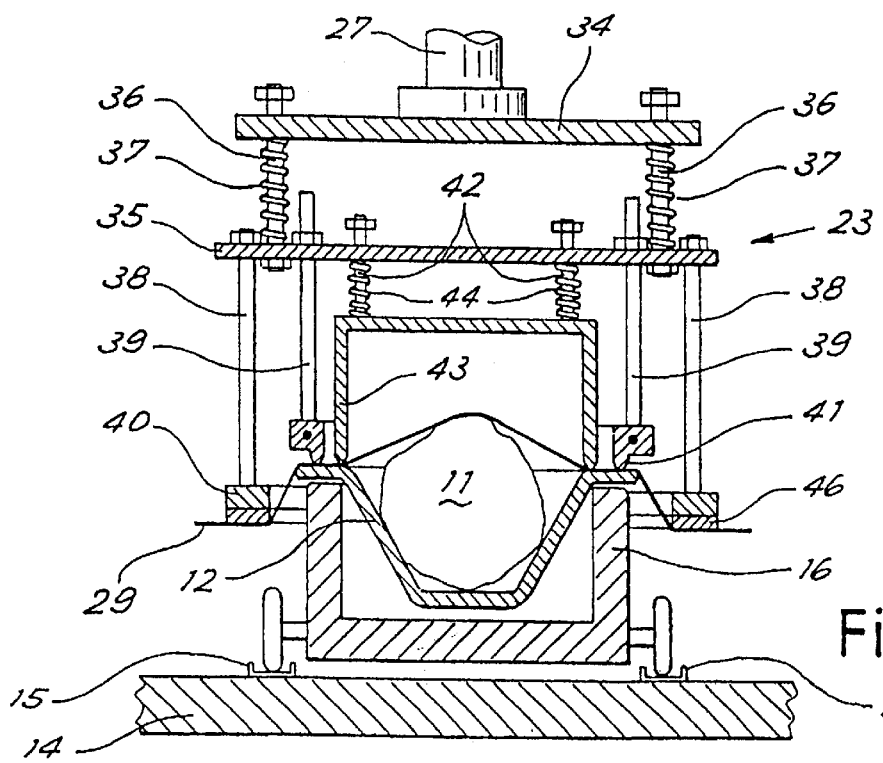
FIG. 4 shows a view similar to that of FIG. 3, during a further phase of the packaging operation.

When the sealing loop 41 reaches the container 12, as shown in FIG. 4, the film 29 is sealed onto the edge of the container. It should be noted that the presence of the runners 36, with the springs 37, between the intermediate surface 35 and the upper surface 34 enables the latter to be lowered slightly even further while the film is being sealed, making it possible to exert a substantially uniform sealing pressure around the edge of the container 12.

By using an appropriate timer (not shown in that it is obvious to the expert in the field) it is possible to keep the sealing loop 41 in contact with the edge of the container 12 for a length of time necessary to seal the film completely; after which the head 23 is made to rise. Lastly, the saddle 16 is returned to the stroke end position that it was in at the beginning of the cycle, so as to allow the sealed container to be removed and replaced with one still to be packaged. Simultaneously, the head 23 returns above the surface 32 and, thanks to the operation of the microswitch 45, descents to grip the end of the film again.

Upon completion of the sealing operation, there may remain a fine strip of film around the edge of the container (easily removably by hand or mechanically), corresponding to the distance between the sealing loop 41 and the gripping loop 40. However, it consists of a portion of waste substantially negligible compared to the strip used for the folding required by conventional packaging systems.

Obviously, thanks to the external frame 40 the film is stretched taut even if the product does not protrude from the tray. By adjusting the length of the supports 38 it is also possible to adjust the stretching of the film.

Figure 5:
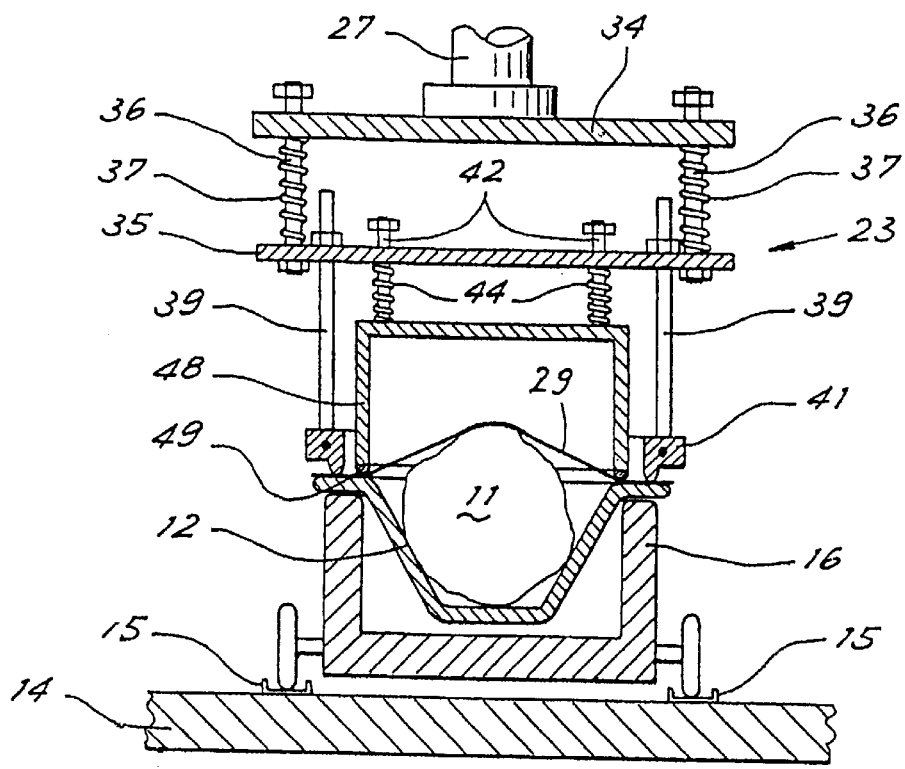
FIG. 5 shows a view similar to that of FIG. 4, referring to a variation in the embodiment of the device according to the invention.

FIG. 5 shows a variation on the embodiment of the sealing head 23, in which the pressing loop and the film gripping and pulling loop are composed of a single loop 48, which like loop 40, has formed on its lower edge a very smooth, mirror-like surface 49 for effecting adhesion of the film 29 cohesively to such surface. This embodiment is particularly advantageous, in that it does away entirely with the problem of scraps of film and makes it possible to simplify the structure of the sealing head 23 by eliminating the loop 40 and relevant supports 38.

Figure 6:
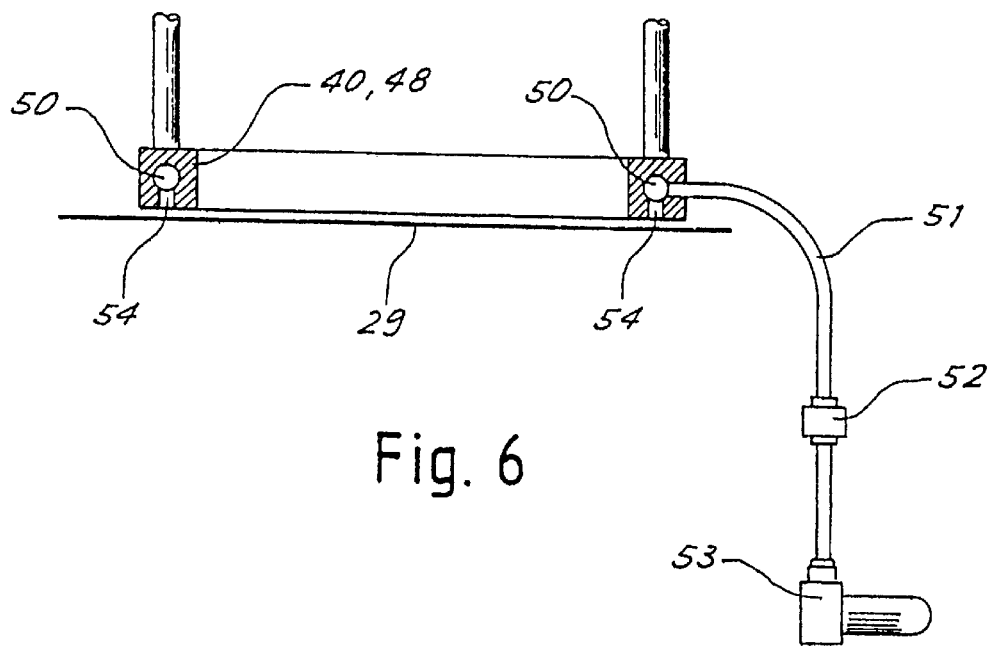
FIG. 6 shows a schematic view of a different embodiment of the film gripping loop.

It is obvious that the packaging device according to the invention, shown here operating on a tray type container, can also be used with other types of containers, for example, flat supports, with appropriate modifications to the housing 16. The foregoing description of an embodiment applying the innovative principles of this invention is obviously given by way of example in order to illustrate such innovative principles and should not therefore be understood as a limitation to the sphere of the invention claimed herein. For example, the film gripping and pulling loop can be operated by suction, instead of by cohesion or electrostatic adherence. As shown schematically in FIG. 6, the gripping loop 40, 48 can be internally provided with an annular chamber 50, connected by means of ducts 51 and solenoid valves 52, to vacuum pump 53. Suction nozzles 54 connect the annular chamber 50 with the lower film gripping surface.

Moreover, the translation of the film and the container can be achieved in a different way to the one shown. For example, translation of the film to the position above the container to be sealed can be achieved by making the support 32 forming part of the film feed unit horizontally movable. In this case, the sealing head 23 can be fixed in the horizontal plane and simply provided with means for movement in a vertical direction. Likewise, as regards the vertical movement, the head 23 can be made fixed, with the support for the container 12 vertically movable.

The foregoing gripping loops 40 and 48 can be made of various materials such as silicone rubber, plastic materials and metallic alloys, e.g. lapped chromium-plated steel, but in any case, with the respective surfaces 46 and 49 thereof being very smooth, mirror-like surfaces to which the film 29 will adhere cohesively—i.e. by electrostatic molecular attraction.

What is claimed is:

1. A device for packaging products (11) with stretchable plastic film (29) on a support (12) for the product (11) comprising means (16) housing a support (12) in a position to receive the film (29), means (23) for gripping and applying the film (29) on the support (12) and means (41) for sealing the film on the support, said means (23) for gripping and applying the film comprising a movable stretching frame (40, 43, 48) for pressing the plastic film against the outer edge of the support (12) in order to stretch the film over the product on the support (12), said movable stretching frame having gripping elements (40, 48) provided with portions (46, 49) each having a smooth, mirror-like surface operative to adhere cohesively with said film upon engagement therewith.

2. A device as claimed in claim 1, characterized in that the means (23, 41) for applying the sealing the film (29) and the stretching frame (40, 43, 48) are vertically movable with respect to the means (16) housing a support (12) in position for receiving the film (29).

3. A device as claimed in claim 1, characterized in that the stretching frame (40, 43, 48) secures the film between itself and the edge of said support (12).

4. A device as claimed in claim 1, characterized in that the means (23, 41) for gripping, applying and sealing the film (29) and the stretching frame (40, 43, 48) comprise concentric elements with a substantially annular lower edge positioned to follow the contours of the support, the innermost element (43) constituting the film pressing frame.

5. A device as claimed in claim 4, characterized in that the sealing element (41) is disposed between the pressing element (43) and a gripping element (40).

6. A device as claimed in claim 4, characterized in that the element (43) constituting the film pressing frame is movable resiliently in a vertical direction with respect to the elements constituting the means for gripping (40) and sealing (41) the film (29), which in turn are resiliently movable in a vertical direction with respect to a support (34) which is vertically movable with respect to the support (12) supporting the product to be packaged.

7. A device as claimed in claim 6, including springs (37, 44) inserted along respective runners (36, 42) for effecting said resilient movability of said film pressing frame and said elements (40, 41) for gripping and sealing the film.

8. A device as claimed in claim 4, characterized in that the elements for gripping and stretching the film (29) comprise a single loop (48) resiliently movable in a vertical direction with respect to the sealing element (41), which in turn is resiliently movable in a vertical direction with respect to a support (34) which is vertically movable with respect to the support (12) supporting the product to be packaged.

9. A device as claimed in claim 1, characterized in that the elements constituting means (23, 41) for gripping, applying and sealing the film (29) and the stretching frame (40, 43) are supported in a head (23) which is vertically movable to bring it close to the support for the product to be packaged.

10. A device as claimed in claim 9, characterized in that the head (23) is movable horizontally between a first position in which it grips the film (29) from a film feed unit (31, 32) and a second position in which it attaches the film onto the support (12) of the product to be packaged.

11. A device as claimed in claim 10, characterized in that the means housing the support (12) comprises of a saddle (16) movable in a horizontal plane between a first position for loading a support to be packaged and unloading a packaged support and a second position for receiving the film (29), and the saddle (16) and the head (23) are movable in synchronism between the respective first and second operating positions.

12. A device as claimed in claim 11, characterized in that the saddle (16) and the head (23) are secured to a belt-driven pulling means (18), in correspondence with legs of the belt movable in opposite directions to each other in order to achieve a reciprocal approach/drawing apart movement of the saddle (16) and head (23).

13. A device as claimed in claim 10, characterized in that the head (23) is supported, vertically movable, by a carriage (24) horizontally movable on a plane (25) between two positions of the head (23).

14. A device as claimed in claim 13, characterized in that the head (23) is vertically movable with respect to the carriage (24) by means of a rack coupling (27, 28).

15. A device as claimed in claim 13, characterized in that, disposed in correspondence with the stroke end positions of the carriage (24) are microswitches (45, 47) for automatic control by the carriage of the vertical movement of the head (23).

16. A device as claimed in claim 10, characterized in that the film feed unit comprises a surface (32) for resting a leading portion of the film (29) from a feed reel (31), a blade (33) being disposed at the end of the surface (32) for cutting the portion of film necessary to package a support (12).

17. Device as claimed in claim 1, characterized in that the means housing the support (12) comprises a saddle (16) movable in a horizontal plane between a first position for loading a support to be packaged and unloading a packaged support and a second position for receiving the film (29).

18. A device as claimed in claim 1, characterized in that the support (12) consists of a tray at least partially housing the product (11).

* * * * *